United States Patent
Wang

(10) Patent No.: US 9,077,612 B2
(45) Date of Patent: Jul. 7, 2015

(54) METHOD FOR MANAGING CONFIGURATION INFORMATION OF AN OUTSOURCED PART, AND METHOD AND SYSTEM FOR MANAGING AN ALARM OF AN OUTSOURCED PART

(75) Inventor: Ping Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 185 days.

(21) Appl. No.: 13/257,906

(22) PCT Filed: Dec. 22, 2009

(86) PCT No.: PCT/CN2009/075814
§ 371 (c)(1),
(2), (4) Date: Sep. 20, 2011

(87) PCT Pub. No.: WO2011/003261
PCT Pub. Date: Jan. 13, 2011

(65) Prior Publication Data
US 2012/0096063 A1    Apr. 19, 2012

(30) Foreign Application Priority Data
Jul. 8, 2009  (CN) .......................... 2009 1 0158513

(51) Int. Cl.
*G06F 15/16* (2006.01)
*H04L 12/24* (2006.01)
(52) U.S. Cl.
CPC ............. *H04L 41/06* (2013.01); *H04L 41/0213* (2013.01); *H04L 41/082* (2013.01)
(58) Field of Classification Search
CPC ................................ G06F 15/16; H04L 12/20
USPC ....................................................... 709/201
See application file for complete search history.

(56) References Cited

U.S. PATENT DOCUMENTS

| 6,263,455 B1 | 7/2001 | Bannister |
| 6,862,698 B1 * | 3/2005 | Shyu ................................ 714/57 |

(Continued)

FOREIGN PATENT DOCUMENTS

| CN | 1885868 A | 12/2006 |
| CN | 1909486 A | 2/2007 |

(Continued)

OTHER PUBLICATIONS

Supplementary European Search Report in European application No. 09847012.3, mailed on Oct. 9, 2012.

(Continued)

*Primary Examiner* — Vivek Srivastava
*Assistant Examiner* — Sibte Bukhari
(74) *Attorney, Agent, or Firm* — Oppedahl Patent Law Firm LLC

(57) ABSTRACT

A method and system for managing an alarm of an outsourced part and a method for managing configuration information of an outsourced part are provided, so as to solve the problem in the prior art that the maintenance operation in a Business Operation Support System (BOSS) for the alarm function of the outsourced part is complex. The method for managing configuration information of an outsourced part is applied to a system for managing an alarm of an outsourced part, and the system comprises a client side and a server side. The method comprises: the client side receives a request of a user for operating configuration information of the outsourced part; the client side performs a corresponding operation on the configuration information of the outsourced part that the client side stores according to the request for the operation, and sends an operation result to the server side according to the type of the operation; and the server side performs an update processing on the configuration information of the outsourced part that the server side stores according to the operation result. With the technical is solution of the present invention, the maintenance operation of the BOSS on the alarm function of the outsourced part could be simplified.

6 Claims, 4 Drawing Sheets

(56) References Cited

U.S. PATENT DOCUMENTS

| | | |
|---|---|---|
| 7,062,765 B1 | 6/2006 | Pitzel |
| 7,159,031 B1 | 1/2007 | Larkin et al. |
| 2002/0194319 A1 | 12/2002 | Ritche |
| 2005/0166099 A1 | 7/2005 | Shyu |
| 2006/0265471 A1 | 11/2006 | Pitzel |

FOREIGN PATENT DOCUMENTS

| | | |
|---|---|---|
| CN | 1929405 A | 3/2007 |
| CN | 1968133 A | 5/2007 |
| CN | 101009004 A | 8/2007 |
| EP | 2109255 A1 | 10/2009 |

OTHER PUBLICATIONS

International Search Report in international application No. PCT/CN2009/075814, mailed on Apr. 15, 2010.

English Translation of the Written Opinion of the International Search Authority in international application No. PCT/CN2009/075814, mailed on Apr. 15, 2010.

* cited by examiner

METHOD FOR MANAGING CONFIGURATION INFORMATION OF AN OUTSOURCED PART, AND METHOD AND SYSTEM FOR MANAGING AN ALARM OF AN OUTSOURCED PART

TECHNICAL FIELD

The present invention relates to a network management technology in the field of communications, particularly to a method for managing configuration information of an outsourced part, and a method and system for managing an alarm of an outsourced part.

BACKGROUND

At present, a value-added service is an important profit source in the telecommunications industry, and a Business Operation Support System (BOSS) is the core and the key point of the value-added service management. The BOSS has become the most complex part with the most contents in all services, and it also has features like a large network size, multiple business lines and a large number of users, so as to make the development, maintenance and use of the BOSS more complex.

With the wide application of the value-added service, various outsourced parts for realizing the value-added service (namely, a software module or a hardware module, usually is a pluggable module, for example, Electromagnetic Compatibility (EMC), Network Appliance (NetApp), a load balancer, an Allied Telesis switch and so on) are applied to a communication system, and alarms of these outsourced parts are managed by the BOSS. An outsourced part alarm module related to network management in the BOSS becomes a module that is relatively difficult to be maintained in the BOSS, because it is complex to realize the alarm; with the diversity of the alarm of the outsourced part, the difficulty of maintaining the outsourced part alarm module is increased.

The alarm of the outsourced part, namely, the BOSS performs a certain processing on alarm information and a notification message which are sent by the outsourced part and then sends them to an upper-level network management system of the BOSS. At present, the BOSS basically uses a customizing way for managing the alarm of the outsourced part; when the outsourced part is added to the communications system, it is needed to correspondingly add the alarm function supporting the outsourced part in the BOSS, and the process comprises: modifying codes of the outsourced part alarm module in the BOSS according to the Management Information Base (MIB) descriptive information of the outsourced part needing support and the a definition of an alarm level, so as to add the function of parsing a Trap message and a Syslog message of the outsourced part; and upgrading the version on site after the test indicates that the code is modified successfully, thereby providing support to the alarm of the outsourced part. When it is needed to modify the MIB description of the of the outsourced part or the definition of the alarm level, the way of modifying codes is also needed to be adopted to realize improvement to the alarm function of the outsourced part.

At present, the customizing way is adopted in the BOSS to manage the outsourced part, with defects that it is needed to adopt the way of modifying codes to realize the function of parsing the message of the outsourced part whenever one outsourced part is added, so as to add support to the alarm of the outsourced part; in addition, aiming at the outsourced parts of the same type, if the model numbers are different, the is corresponding descriptive information of the MIB and the definition of the alarm level are different; and because parsing of the message at each node adopts the way of hard coding, for the outsourced parts of the same type with different model numbers, it is also needed to adopt the way of modifying codes to support the alarm; with addition or replacement of the outsourced part and the diversity of requirement on the alarm of the outsourced part, realizing the support to the alarm of the outsourced part by adopting the existing method will cause the code processing capacity of the outsourced part alarm module to become larger and larger, and cause the code maintenance to become harder and harder, and more and more complex, so a new processing method is urgently needed to realize the alarm function of the outsourced part in the BOSS.

SUMMARY

An embodiment of the present invention provides a method for managing configuration information of an outsourced part, and a method and system for managing an alarm of an outsourced part, so as to simplify the maintenance operation of the service operation support system on the alarm function of the outsourced part.

A system for managing an alarm of an outsourced part, comprises:

a client side, which is arranged to receive a request of a user for operating configuration information of the outsourced part, perform a corresponding operation on the configuration information of the outsourced part that the client side stores according to the request, and sending an operation result to a server side according to a type of the operation; and the server side, which is arranged to perform an update processing on the configuration information of the outsourced part that the server side stores according to the operation result sent by the client side.

A method for managing configuration information of an outsourced part, applied to the above-mentioned system for managing an alarm of an outsourced part comprising a client side and a server side, comprises:

a client side receives a request of a user for operating configuration information of the outsourced part;

the client side performs a corresponding operation on the configuration information of the outsourced part that the client side stores according to the request, and sends an operation result to the server side according to a type of the operation; and the server side performs an update processing on the configuration information of the outsourced part that the server side stores according to the operation result.

A method for managing an alarm of an outsourced part, applied to the above-mentioned system for managing an alarm of an outsourced part comprising a client side and a server side, comprises:

a server side receives an alarm message sent by the outsourced part;

the server side parses the received alarm message according to configuration information of the outsourced part that it stores; and the server side sends the parsed message information to a network management system.

In the embodiments of the present invention, the system for managing an alarm of an outsourced part comprises a client side and a server side, wherein the client side can perform a corresponding operation on configuration information of the outsourced part that the client side stores according to a request for operating the configuration information of the outsourced part sent by a user, and send the operation result to the server side to make the server side perform a corresponding update processing on the configuration information of the outsourced part that the server side stores, so that the server side can parse the alarm message according to the configuration information of the outsourced part that it stores when receiving the alarm message sent by the outsourced part. It can be seen that the technical solution of the present invention realizes the management operation on the configuration information of the outsourced part through the client side set in the system for managing the outsourced part; when it is needed to add, modify or delete an alarm function of a certain outsourced part in the system, the support to the alarm function of the outsourced part can be realized just by performing the corresponding management operation on the configuration information of the outsourced part through the client side, which reduces maintenance to code and simplifies the maintenance flow of the alarm function of the outsourced part to some extent, and is favourable to the development and upgrade of the alarm function of the outsourced part, compared with the prior art that realizes the support to the alarm function of the outsourced part by adding a code or modifying a code.

DETAILED DESCRIPTION

Figure 1:
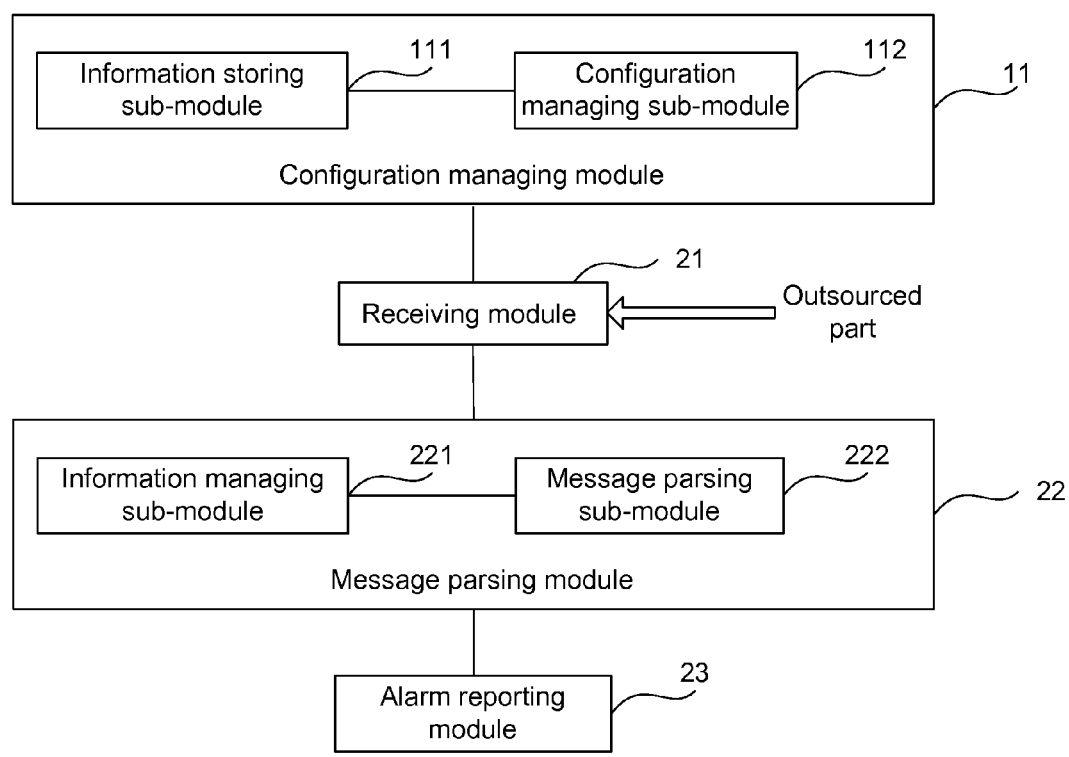
FIG. 1 shows a structural diagram of a system for realizing an alarm function of an outsourced part according to an embodiment of the present invention.

The embodiments of the present invention will be described below with reference to the drawings in detail.

In the embodiment of the present invention, a system for managing an alarm of an outsourced part performs management to the alarm of the outsourced part by the way of dynamic configuration and dynamic parse, instead of by the customizing way. The system for managing the alarm of the outsourced part in the embodiment of the present invention can be set in a BOSS or independent of the BOSS, and the system comprises a foreground function module and a background function module which both can adopt a Browser/Server (B/S) structure or a Client/Server (C/S) structure.

The flow of performing the dynamic configuration on the outsourced part by the embodiment of the present invention is as follows.

Step 1: the foreground function module receives a request for operating configuration information of the outsourced part which is sent by a user.

Step 2: the foreground function module performs a corresponding operation on the configuration information of the outsourced part stored in the module according to the request for operation, and sends an update message of configuration information to the background function module according to the type of the operation and the operation result, wherein the foreground function module can acquire the configuration information of the outsourced part from the background function module when the system is started, and store it; the configuration information that the foreground function module stores and the configuration information that the background function module stores can be further kept consistent through the information synchronizing process.

Step 3: the background function module performs the update processing on the corresponding configuration information of the outsourced part that it stores according to the received update message of configuration information.

The foreground function module can adopt friendly interface way, such as the way of Web page, to provide the user with an interface of maintaining the alarm of the outsourced part. The user can add, modify, delete or search the configuration information of the outsourced part through the interface of maintaining the alarm of the outsourced part.

The system for managing the alarm of the outsourced part manages the outsourced part as a device; the configuration information of the outsourced part comprises basic information and information of a message parsing rule of the outsourced part, wherein the basic information can comprise a device name of the outsourced part, an identifier of device enterprise uniquely identifying the outsourced part, OID description information of a device and so on, the information of the message parsing rule can comprise a Trap message parsing rule, a Syslog message parsing rule and so on, for sending the alarm information. The message parsing rule indicates the information that a specified field in the message corresponds to the specific alarm level and alarm description and other is information.

The flow of performing the dynamic parse on the alarm message of the outsourced part by the embodiment of the present invention is as follows.

Step 1: the background function module receives an alarm message sent by the outsourced part.

Step 2: the background function module acquires information of a message parsing rule of the outsourced part, and parses the received message according to the information of the message parsing rule.

Step 3: the background function module sends the parsed message information to an upper-level network management system.

In the embodiment of the present invention, the foreground function module provides the user with the interface of maintaining the alarm of the outsourced part, and the user can realize the dynamic configuration on the outsourced part just by adding, modifying or deleting the configuration information of the outsourced part in the interface, and realize the maintenance to the alarm of the outsource part without frequently modifying the code used for parsing the alarm message of the outsource part in the background function module, thus simplifying the maintaining process of the system for managing the alarm of the outsourced part on the alarm function of the outsource part.

Based on above-mentioned flow, the structure of the system for managing the alarm of the outsourced part provided by the embodiment of the present invention can be shown in FIG. 1.

FIG. 1 shows a structural diagram of a system for managing an alarm of an outsourced part provided by an embodiment of the present invention; the system can comprise: a configuration managing module 11, a receiving module 21, a message parsing module 22 and an alarm reporting module 23, wherein the configuration managing module 11 belongs to the foreground function module and can be configured at the client side; the receiving module 21, the message parsing module 22 and the alarm reporting module 23 belong to the background function module and can be configured at the server. The main functions of these function modules are as follows:

the configuration managing module 11 is used for providing a user with an interface of maintaining the alarm of the outsourced part, receiving a request for operating configuration information of the outsourced part that is submitted by the user through the interface, and performing a corresponding operation on the configuration information of the outsourced part stored in the module according to the request, when the operation processing changes the configuration information of the outsourced part, sending the changed configuration information of the outsourced part to the receiving module 21 through a message of notifying change of the configuration information of the outsourced part;

the receiving module 21 is used for receiving the message of notifying change of the configuration information of the outsourced part sent by the configuration managing module 11, and receiving the messages, such as a Trap message and a Syslog message, sent by outsourced parts;

the message parsing module 22 is used for storing the configuration information of the outsourced part, and parsing the message received by the receiving module 21 according to the stored configuration information of the outsourced part, and further used for updating (comprising adding, modifying or deleting) the stored configuration information of the outsourced part according to the message of notifying change of the configuration information of the outsourced part that is sent by the configuration managing module 11; and the alarm reporting module 23 is used for sending the message information parsed by the message parsing module 22 to the upper-level network management system.

The message parsing module 22 may comprise: an information managing sub-module 221 and a message parsing sub-module 222, wherein the information managing sub-module 221 is used for storing the configuration information of the outsourced part, and updating the stored configuration information of the outsourced part according to the message of notifying change of the configuration information of the outsourced part that is sent by the configuration managing module 11; and the message parsing sub-module 222 is used for acquiring information of a message parsing rule of the outsourced part from the information managing sub-module 221, when the receiving module 21 receives the message sent by the outsourced part, and parsing the message according to the information of the message parsing rule.

The configuration managing module 11 may comprise: an information storing sub-module 111 and a configuration managing sub-module 112, wherein the information storing sub-module 111 is used for storing the configuration information of the outsourced part, and can build a HASH table of the configuration information of the outsourced part by taking an identifier of device enterprise of the outsourced part as index, so as to perform searching operation on the configuration information of the outsourced part by using the HASH table, thereby improving the processing efficiency; and the configuration managing sub-module 112 executes the specific operation on processing of information configuration.

Figure 4:
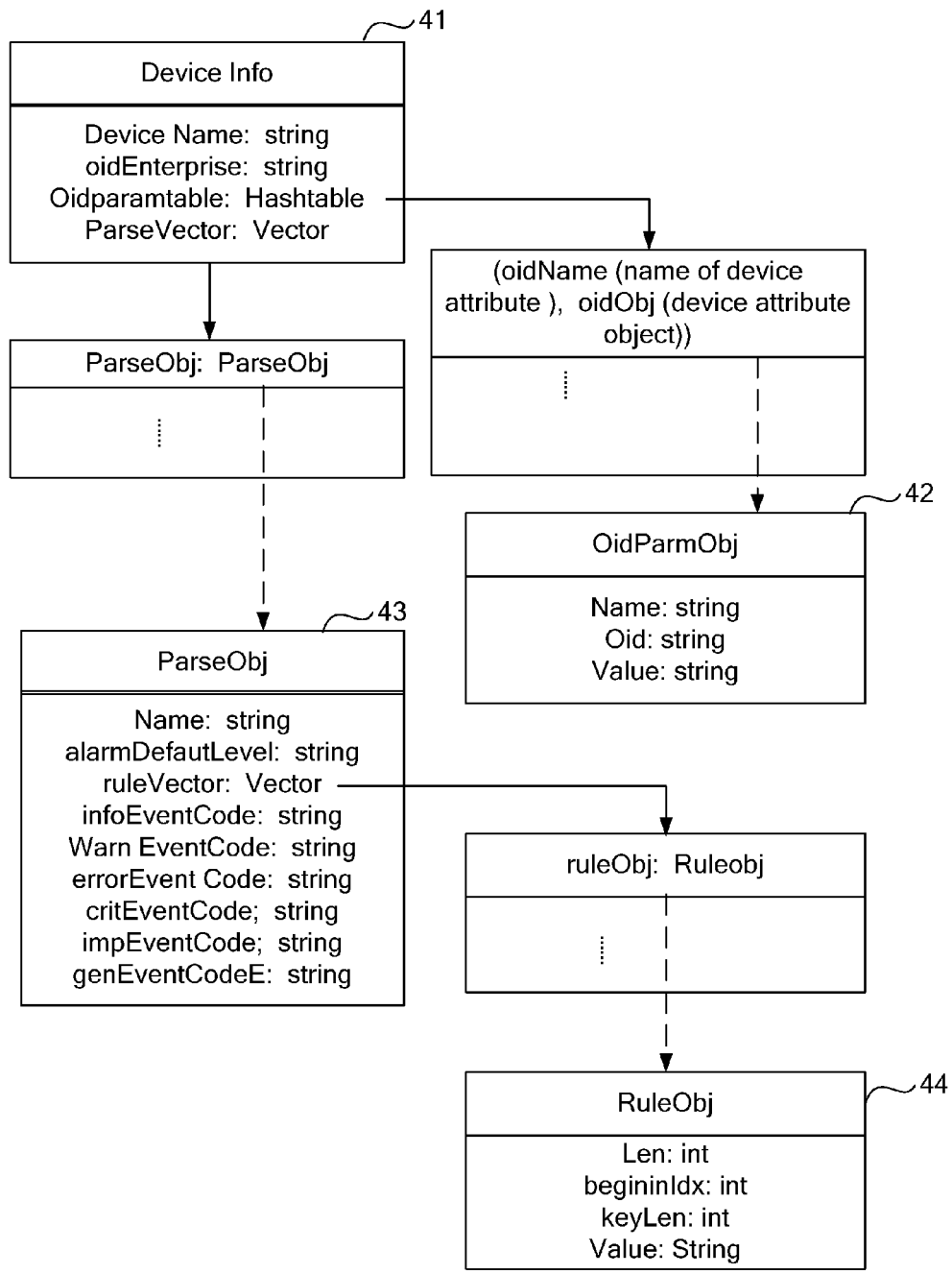
FIG. 4 shows a storage structure diagram for storing information of an outsourced part in the system shown in FIG. 1 according to an embodiment of the present invention.

In above-mentioned system, the configuration information of the outsourced part stored in the configuration managing module 11 and the message parsing module 22 can be stored through the data structure shown in FIG. 4.

Figure 2:
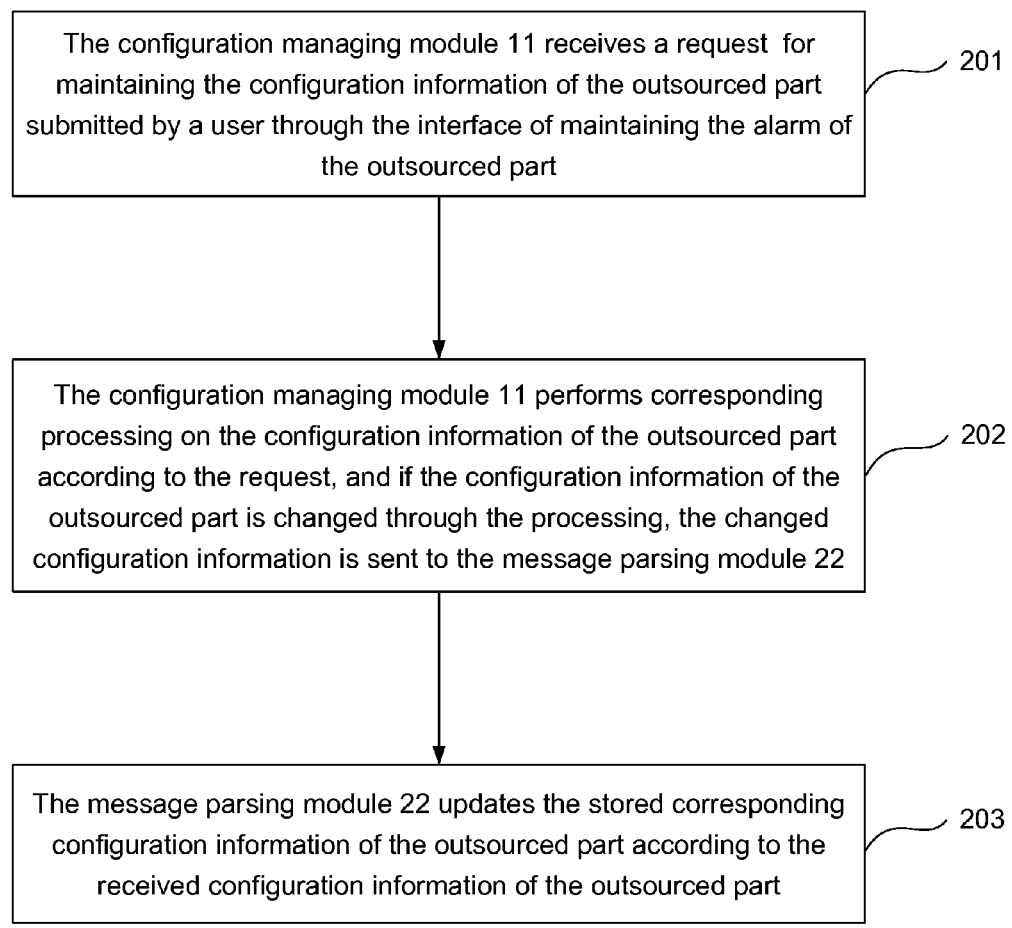
FIG. 2 shows a flowchart of realizing information update of an outsourced part based on the system shown in FIG. 1 according to an embodiment of the present invention.

With reference to FIG. 1, the flow that the system realizes the dynamic configuration of the configuration information of the outsourced part can be shown in FIG. 2.

When the system is started, the configuration managing module 11 acquires the configuration information of the outsourced part from the background function module and stores the configuration information of the outsourced part in the information storing sub-module 111. The configuration managing module 11 can still display the configuration information of the outsourced part stored in the information storing sub-module in the interface of maintaining the alarm of the outsourced part for the user to selectively perform operation. When the user accesses the interface (or page) of maintaining the alarm of the outsourced part of the system through the portal website of is the BOSS or the client side of the system for managing the alarm of the outsourced part, and submits a request for maintaining the alarm of the outsourced part through the interface, the flow comprises the following steps.

Step 201: the configuration managing module 11 receives a request for maintaining the configuration information of the outsourced part submitted by a user through the interface of maintaining the alarm of the outsourced part.

Step 202: the configuration managing module 11 performs a corresponding operation on the configuration information of the outsourced part according to the request, if the configuration information of the outsourced part is changed through the operation process, the changed configuration information of the outsourced part is sent to the message parsing module 22 through a message of notifying change of the configuration information of the outsourced part, wherein the message is an internal system message (namely, adopting the internal protocol of the system to perform encapsulation). The configuration managing module 11 can provide a user with the following four functions: adding, deleting, modifying and inquiring the configuration information of the outsourced part. The specific operations of the configuration managing module 11, according to the type of the operation selected by a user, are specifically:

adding operation: after the user adds the configuration information of the outsourced part through the interface of maintaining the alarm of the outsourced part and selects an adding command, the configuration managing sub-module 112 stores the added configuration information temporarily, and searches, in the HASH table of the configuration managing module to determine whether the identifier of device enterprise of the outsourced part already exists or not, according to the input identifier of device enterprise of the outsourced part; if yes, the configuration managing sub-module 112 prompts the user that the outsourced part already exists, if not, it stores the configuration information of the outsourced part input by the user in the information storing sub-module 111 of the configuration managing module and further updates the HASH table, and then sends a message of notifying change of the configuration information of the outsourced part to the background function module, wherein the configuration information of the outsourced part added by the user and corresponding number of event change (which can identify the type of this operation) are included in the message;

modifying operation: after the user inputs or selects the identifier of device enterprise of the outsourced part through the interface of maintaining the alarm of the outsourced part and selects a modifying command, the configuration managing sub-module 112 calls corresponding information from the HASH table of the configuration managing module and displays the information on the interface in editable state, and prompts the user that the corresponding outsourced part does not exist, if the identifier of device enterprise does not exist; when the user modifies the configuration information of the outsourced part through the interface and selects a confirming command or a submitting command, the configuration managing sub-module 112 stores the modified configuration information in the information storing sub-module 111 of the configuration managing module and further updates the HASH table, and then sends a message of notifying change of the configuration information of the outsourced part, wherein the configuration information of the outsourced part modified by the user and corresponding number of event change are included in the message;

deleting operation: after the user inputs or selects the identifier of device enterprise of the outsourced part through the interface of maintaining the alarm of the outsourced part, and selects a deleting command, the configuration managing sub-module 112 calls corresponding information from the HASH table of the configuration managing module; if the identifier of device enterprise do not exist, the configuration managing sub-module 112 prompts the user that the corresponding outsourced part do not exist; if the identifier of device enterprise exists, the configuration managing sub-module 112 deletes the configuration information of the outsourced part from the information storing sub-module 111 of the configuration managing module and updates the HASH table, and then sends a message of notifying change of the configuration information of the outsourced part, wherein the deleted identifier of device enterprise of the outsourced part and corresponding number of event change are included in the message;

inquiring operation: after the user inputs (or selects) the identifier of device enterprise of the outsourced part or the name through the interface of maintaining the alarm of the outsourced part, and selects an inquiring command, the configuration managing module 11 searches for the corresponding information from the HASH table according to the information input by the user; if the information is found, the configuration managing module 11 displays it on the interface, or else, prompts the user that the corresponding outsourced part cannot be found.

Step 203: the message parsing module 22 updates the configuration information of the outsourced part stored in the message parsing module 22 according to the message of notifying change of the configuration information of the outsourced part received from the configuration managing module 11, so as to be used for the parse processing on the subsequent alarm message of the outsourced part.

In this step, after the information managing sub-module 221 receives the message of notifying change, it updates the configuration information of the outsourced part stored in it according to the number of event change and the configuration information included in the message, so that the message parsing module 22 and the configuration managing module 11 modify the configuration information of the outsourced part synchronously. The updating operation may comprise: if the type of the operation identified by the number of event change is adding, adding the configuration information included in the update message to the information managing sub-module 221; if the type of the operation identified by the number of event change is modifying, overlaying the corresponding information in the information managing sub-module 221 with the configuration information included in the update message according to the identifier of device enterprise included in the update message; if the type of the operation identified by the number of event change is deleting, the corresponding information in the information managing sub-module 221 is deleted according to the identifier of device enterprise included in the update message.

Figure 3:
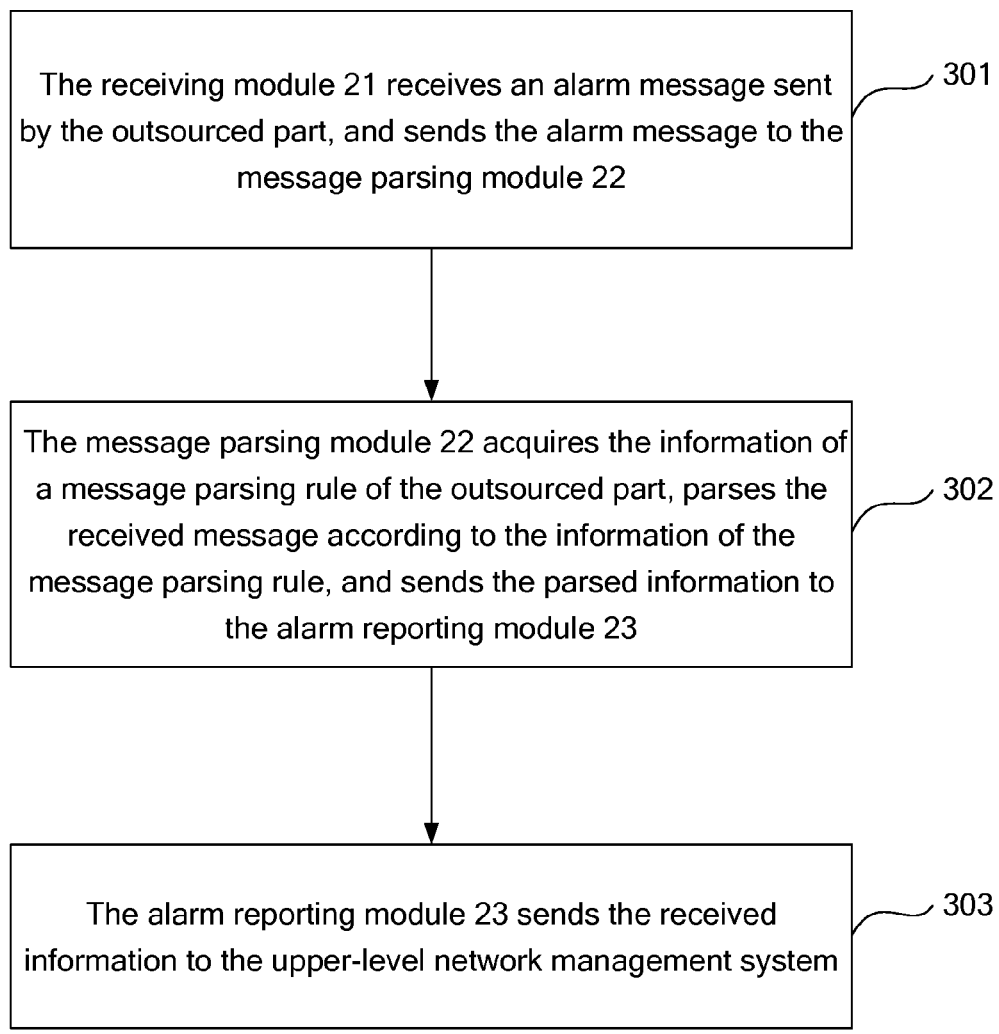
FIG. 3 shows a flowchart of realizing an alarm function of an outsourced part based on the system shown in FIG. 1 according to an embodiment of the present invention.

FIG. 3 is a flowchart of realizing an alarm of the outsource part in the embodiment of the present invention, which comprises the following steps.

Step 301: the receiving module 21 receives an alarm message sent by the outsourced part, and sends the received alarm message to the message parsing module 22.

In the above-mentioned step, the alarm message can comprise a Trap message and a Sylog message; after the system is started, the receiving module 21 reads information of port number, such as a Trap message port number and a Sylog message port number, from the system configuration file or the configuration file recorded with port information, and monitors the ports of the Trap message and the Sylog message; when monitoring that there is a message on the port which is sent by using the User Datagram Protocol (UDP) packet, the receiving module 21 receives the message and sends the received message to the message parsing module 22 through an internal message according to the specified structure.

Step 302: the message parsing sub-module 222 in the message parsing module 22 acquires the information of the message parsing rule corresponding to the identifier of device enterprise from the information managing sub-module 221 according to the identifier of device enterprise of the outsourced part included in the message, parses the received message according to the information of the message parsing rule, and sends the parsed message information (such as information of alarm level, alarm content) to the alarm reporting module 23.

Step 303: the alarm reporting module 23 sends the received message information to the upper-level network management system.

In this step, the alarm reporting module 23 encapsulate the received message information into a Trap message according to the standard Simple Network Management Protocol (SNMP) and sends the Trap message to the upper-level network management system through the UDP packet.

In the embodiment of the present invention the information managing sub-module 221 and the configuration managing module 11 can adopt a template of storing information of the outsourced part shown in FIG. 4 to store the configuration information of the outsourced part. In FIG. 4, the device information (Device Info) in the configuration information storing structure of the outsourced part 41 stores a device name (deviceName) of the outsourced part, an identifier of device enterprise of the outsourced part (oidEnterprise), a device attribute table of the outsourced part (oidParamTable) and a message parsing rule set of the outsourced part (parseVector). Each device attribute stored in the device attribute table corresponds to the information item in the basic information of the outsourced part; the storage structure of device attribute is shown as the device attribute storing structure 42; the device attribute object (OidParmObj) in the device attribute storing structure 42 comprises a name of the device attribute (Name), an identifier of the device attribute (Oid) and a value of the device attribute (Value); the message parsing rule set stores the information of the message parsing rule of the outsourced part and the storage structure thereof is shown as the message parsing rule structure 43.

Each item in the device attribute table stores the corresponding device attribute, as shown in the device attribute table 42 of outsourced part in FIG. 4, each device attribute corresponds to a single name, a unique identifier OID and a unique attribute value.

The parse object (Parse Obj) in the message parsing rule storing structure 43 (ParseObj) stores a parsing field name (name), an alarm default level (alarmDefaultLevel), a parsing rule set (ruleVector), a field value of information level alarm (infoEventCode), a field value of warn level alarm (warnEventCode), a field value of error level alarm (errorEventCode), a field value of critical level alarm (critEventCode), a field value of important level alarm (impEventCode) and a field value of general notice level alarm (genEventCode), wherein the alarm default level is that there is no alarm level configured or no alarm level can be found according to configuration;

for the parsing rule set, the parsing rules of each node can be various, and the storage content is RuleObj structure object;

for the field value of information level alarm, the field value of warn level alarm, the field value of error level alarm, the field value of critical level alarm and the field value of general notice level alarm, the info level alarm is included in the value, and multiple field values are separated by the comma.

The parsing rule set stores the information of the parsing rule of each field in the message; for the information of the parsing rule of each field, the storing way is shown as the storage structure of field parsing rule 44; the parsing rule object (ruleObj) in the storage structure of field parsing rule 44 comprises a attribute value length (len), a begin index value of attribute value while parsing (beginIdx), a key value length (keyLen) and a attribute value (value), wherein the attribute values respectively correspond to the alarm levels in the structure of message parsing rule, and the information of alarm level sent by the outsourced part can be known according to the attribute value.

Based on the above-mentioned data structure, when the request for maintaining the configuration information of the outsourced part (such as modifying, deleting the configuration information of the outsourced part and so on) submitted by the user through the interface of maintaining the alarm of the outsourced part is received, searching the device attribute table of outsourced part 42 and the message parsing rule structure 43 from the configuration information storing structure of the outsourced part 41 according to the identifier of device enterprise of the outsourced part input by the user, so as to acquire the basic information and the information of the message parsing rule of the outsourced part.

When the message parsing module 22 receives the alarm message sent by the outsourced part, it can acquire the information of the message parsing rule of the outsourced part from the configuration information storing structure of the outsourced part 41, and then the message parsing sub-module 222 in the message parsing module 22 parses the received message according to the acquired information of the message parsing rule.

In the embodiment of the present invention, the client side of the system for managing the alarm of the outsourced part provides the user with the interface of maintaining the alarm of the outsourced part, the user can send the request for operating the configuration information of the outsourced part to the client side through the interface, and the client side performs the corresponding operation on the configuration information of the outsourced part that it stores according to the request for the operation, and notifies the server side of the operation result according to the type of the operation; the server side performs the update processing on the configuration information of the outsourced part that it stores according to the notice; when the server side receives the alarm message sent by the outsourced part, it acquires the configuration information of the outsourced part sending the message from the configuration information of the outsourced part that it stores, parses the received message according to the information of the message parsing rule in the configuration information, and sends the parsed message information to the upper-level network management system. By adopting the technical solution provided by the embodiments of the present invention, when an outsourced part is added in the BOSS and the alarm function of the outsourced part is improved, the user can realize support to the alarm function of the outsourced part just by adding or modifying the configuration information of the outsourced part through the interface of maintaining the outsourced part, without needing to adding or modifying the code, so the operation flow of supporting the alarm function of the outsourced part is simplified, and it is easier for maintenance of the alarm function of the outsourced part and more favourable to development and upgrade of the alarm function of the outsourced part; in addition, when a new outsourced part is added, it is not needed to add codes in the system to support the alarm function of the outsourced part, therefore quantity of the code is reduced to a certain extent, the network resource is saved, and the cost is reduced.

Obviously, those skilled in the art can make various modifications and transformations to the present invention without departing from the scope and spirit of the present invention. Thus, provided that these modifications and transformations to the present invention are within the scope of the claims of the present invention and equivalent technology thereof, the present invention is intended to comprise these modifications and transformations.

What is claimed is:

1. A system for managing an alarm of an outsourced part, adapted to manage alarm information sent by the outsourced part which is installed in a communication system and configured to implement a value-added service, wherein the system for managing the alarm of the outsourcing part and the outsourced part lie outside of one another, the system for managing the alarm of the outsourcing part comprising:

a client side, which is arranged to, when the outsourcing part has been installed in the communication system, or has been modified or removed from the communication system, receive from a user an operation request for adding, modifying or deleting configuration information of the outsourced part, perform a corresponding operation of adding, modifying or deleting the configuration information of the outsourced part that the client side stores according to the request, and send an operation result to a server side according to a type of the operation, the operation result including an identifier of the type of the operation and configuration information of the outsourced part added, modified or deleted according to the request, wherein the types of the operations include adding, modifying and deleting the configuration information of the outsourced part;

the server side, which is arranged to perform a processing operation corresponding to the identifier on the corresponding configuration information of the outsourced part that the server side stores according to the identifier and the configuration information of the outsourced part in the operation result, and store, into the server side per se, the configuration information of the outsourced part as a result of the processing operation;

wherein the client side comprises:

a processor and a memory, the memory stores a configuration managing module;

the configuration managing module, which is arranged to receive from the user the operation request for adding, modifying or deleting the configuration information of the outsourced part, perform the corresponding operation on the configuration information of the outsourced part that the client side stores according to the request, and send the operation result to the server side according to the type of the operation;

wherein the server side comprises:

a processor and a memory, the memory stores a receiving module, a message parsing module, and an alarm reporting module;

the receiving module, which is arranged to receive the operation result sent by the configuration managing module, and receive an alarm message sent by the outsourced part;

the message parsing module, which is arranged to perform a processing operation corresponding to the identifier on the configuration information of the outsourced part that the server side stores according to the identifier and the configuration information of the outsourced part in the operation result received by the receiving module, and parse the received alarm message according to the configuration information of the outsourced part that the server side stores;

the alarm reporting module, which is arranged to send the message information parsed by the message parsing module to the network management system; and wherein the server side is further arranged to receive the alarm message sent by the outsourced part, parse the received alarm message according to the configuration information of the outsourced part that the server side stores, and send message information parsed to a network management system.

2. The system according to claim 1, wherein the step that the configuration managing module sends the operation result to the server side according to the type of the operation specifically comprises:

the configuration managing module sends the correspondingly added, modified or deleted configuration information of the outsourced part to the server side according to the request for adding, modifying, or deleting the configuration information of the outsourced part.

3. The system according to claim 1, wherein the alarm message received by the receiving module comprises an identifier of device enterprise of the outsourced part;

the step that the message parsing module parses the received alarm massage according to the configuration information of the outsourced part that the server side stores specifically comprises: the message parsing module acquires corresponding information of a message parsing rule according to the identifier of device enterprise of the outsourced part, and parses the received message according to the information of message parsing rule.

4. A method for an alarm of an outsourced part, applied to managing alarm information sent by the outsourced part which is installed in a communication system and configured to implement a value-added service, and wherein a system for managing the alarm of the outsourcing part and the outsourced part lie outside of one another, the method comprising:

receiving, by a client side, from a user an operation request for adding, modifying or deleting configuration information of the outsourced part, when the outsourcing part has been installed in the communication system, or has been modified or removed from the communication system;

performing, by the client side, a corresponding operation of adding, modifying or deleting the configuration information of the outsourced part that the client side stores according to the request, and sending an operation result to a server side according to a type of the operation, the operation result including an identifier of the type of the operation and configuration information of the outsourced part added, modified or deleted according to the request, wherein the types of the operations include adding, modifying and deleting the configuration information of the outsourced part; and receiving, by the server side, the operation result sent by the client side;

performing, by the server side, a processing operation corresponding to the identifier on the corresponding configuration information of the outsourced part that the server side stores according to the identifier and the configuration information of the outsourced part in the operation result, storing, by the server side, into the server side per se, the configuration information of the outsourced part as a result of the processing operation, receiving, by the server side an alarm message sent by the outsourced part;

parsing, by the server side, the received alarm message according to configuration information of the outsourced part that it stores; and sending, by the server side, message information parsed to a network management system.

5. The method according to claim 4, wherein the configuration information comprises basic information and information of a message parsing rule of the outsourced part.

6. The method according to claim 4, wherein the alarm message comprises an identifier of device enterprise of the outsourced part;

the step that the server side parses the received alarm message according to the configuration information of the outsourced part that it stores specifically comprises:

the server side acquires corresponding information of a message parsing rule according to the identifier of device enterprise of the outsourced part, and parses the received message according to the information of the message parsing rule.

* * * * *